(12) United States Patent
Dintenfass et al.

(10) Patent No.: US 12,164,758 B2
(45) Date of Patent: Dec. 10, 2024

(54) SYSTEM AND METHOD FOR DYNAMICALLY CONFIGURING GRAPHICAL USER INTERFACES BASED ON TRACKING RESPONSE TO INTERFACE COMPONENTS

(71) Applicant: BANK OF AMERICA CORPORATION, Charlotte, NC (US)

(72) Inventors: Katherine Kei-Zen Dintenfass, Lincoln, RI (US); Christine D. Black, Brooksville, ME (US); Jinna Zevulun Kim, Charlotte, NC (US); Jo-Ann Taylor, Godalming (GB); Vijaya L. Vemireddy, Plano, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/901,535

(22) Filed: Sep. 1, 2022

(65) Prior Publication Data
US 2024/0077995 A1    Mar. 7, 2024

(51) Int. Cl.
G06F 3/04845    (2022.01)
G06F 11/34    (2006.01)

(52) U.S. Cl.
CPC ...... *G06F 3/04845* (2013.01); *G06F 11/3438* (2013.01)

(58) Field of Classification Search
CPC . G06F 3/04845; G06F 3/0484; G06F 11/3438
USPC ............... 715/206, 744, 765, 825, 826, 866
See application file for complete search history.

(56) References Cited

U.S. PATENT DOCUMENTS

| | | | |
|---|---|---|---|
| 7,971,180 B2* | 6/2011 | Kreamer | G06Q 10/06315 717/102 |
| 8,806,444 B1* | 8/2014 | Podgorny | G06F 11/3452 717/121 |
| 9,563,327 B1* | 2/2017 | Pham | G06F 9/451 |
| 10,929,392 B1* | 2/2021 | Cheng | G06N 3/08 |
| 2007/0130525 A1* | 6/2007 | Murphy | G06F 40/154 707/E17.121 |
| 2008/0104544 A1* | 5/2008 | Collins | G06F 16/9577 715/846 |
| 2013/0014146 A1* | 1/2013 | Bhatia | G06Q 30/0241 725/14 |
| 2014/0122222 A1* | 5/2014 | Rothman | G06Q 30/02 705/14.44 |
| 2014/0282007 A1* | 9/2014 | Fleizach | G06F 9/453 715/728 |

(Continued)

*Primary Examiner* — Hwei-Min Lu
(74) *Attorney, Agent, or Firm* — Moore & Van Allen PLLC; Anoohya Yarlagadda

(57) ABSTRACT

Embodiments of the present invention provide a system for dynamically configuring graphical user interface based on tracking response to interface components. The system is configured for determining that a user has accessed an entity application via a user device, presenting a graphical user interface associated with the entity application to the user on the user device, wherein the graphical user interface comprises one or more interface components, monitoring and capturing response of the user via the user device based on presenting the graphical user interface, gauging the response of the user via an artificial intelligence engine, and dynamically configuring the graphical user interface based on gauging the response of the user.

17 Claims, 5 Drawing Sheets

(56) References Cited

U.S. PATENT DOCUMENTS

| | | | |
|---|---|---|---|
| 2015/0087369 A1* | 3/2015 | McIntyre | G07F 17/3218 |
| | | | 463/31 |
| 2015/0229978 A1* | 8/2015 | Brown | H04N 21/25891 |
| | | | 725/34 |
| 2016/0085430 A1* | 3/2016 | Moran | H04M 1/72454 |
| | | | 715/765 |
| 2016/0094888 A1* | 3/2016 | Peterson | H04N 21/4821 |
| | | | 725/39 |
| 2016/0119666 A1* | 4/2016 | Anschutz | H04N 21/2668 |
| | | | 725/116 |
| 2016/0170584 A1* | 6/2016 | Kumar | G06F 3/0484 |
| | | | 715/810 |
| 2016/0378201 A1* | 12/2016 | Baughman | G06F 8/38 |
| | | | 345/173 |
| 2017/0168703 A1* | 6/2017 | Feris | G06F 3/011 |
| 2017/0174473 A1* | 6/2017 | Simcik | G06F 3/0486 |
| 2017/0262164 A1* | 9/2017 | Jain | G06F 3/04847 |
| 2017/0322679 A1* | 11/2017 | Gordon | G06F 3/013 |
| 2017/0344656 A1* | 11/2017 | Koren | G06F 16/958 |
| 2018/0101854 A1* | 4/2018 | Jones-McFadden | |
| | | | G06F 3/0481 |
| 2018/0254097 A1* | 9/2018 | Gani | G06F 3/013 |
| 2019/0187870 A1* | 6/2019 | Bostick | G06F 3/04886 |
| 2019/0324610 A1* | 10/2019 | Green | H04N 21/42222 |
| 2020/0380060 A1* | 12/2020 | Siani Cohen | G06N 3/08 |
| 2021/0294582 A1* | 9/2021 | Accardo | G06N 3/08 |
| 2021/0368039 A1* | 11/2021 | Voss | H04L 51/216 |
| 2022/0103438 A1* | 3/2022 | Kerzner | G06F 16/9535 |
| 2022/0408011 A1* | 12/2022 | Dal Zotto | G06F 3/14 |

* cited by examiner

SYSTEM AND METHOD FOR DYNAMICALLY CONFIGURING GRAPHICAL USER INTERFACES BASED ON TRACKING RESPONSE TO INTERFACE COMPONENTS

BACKGROUND

Conventional systems do not have the capability to dynamically configure graphical user interfaces of one or more applications based on tracking response of users to one or more interface components. As such, there exists a need for a system that can track response of users to the one or more interface components and dynamically configure and modify in real-time graphical user interfaces of one or more applications.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for dynamically configuring graphical user interface based on tracking response to interface components. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention determines that a user has accessed an entity application via a user device, presents a graphical user interface associated with the entity application to the user on the user device, wherein the graphical user interface comprises one or more interface components, monitors and captures response of the user via the user device based on presenting the graphical user interface, gauges the response of the user via an artificial intelligence engine, and dynamically configures the graphical user interface based on gauging the response of the user.

In some embodiments, the present invention configures the graphical user interface based on at least one of replacing a first interface component of the one or more interface components with a second interface component, adding additional content on the graphical user interface, rearranging content of the graphical user interface, and reconfiguring the one or more interface components.

In some embodiments, the present invention generates a questionnaire associated with the graphical user interface, presents the questionnaire to the user, receives feedback associated with the questionnaire from the user, and reconfigures the graphical user interface based on the feedback received from the user.

In some embodiments, the questionnaire is generated based on gauging the response of the user.

In some embodiments, the present invention retrains the artificial intelligence engine based on the feedback received from the user.

In some embodiments, the present invention monitors and captures the response of the user via one or more components of the user device.

In some embodiments, the present invention presents at least one other graphical user interface associated with at least one other page of the entity application, monitors and captures the response of the user associated with the at least one other graphical user interface, gauges the response of the user, and configures the at least one other graphical user interface based on gauging the response of the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
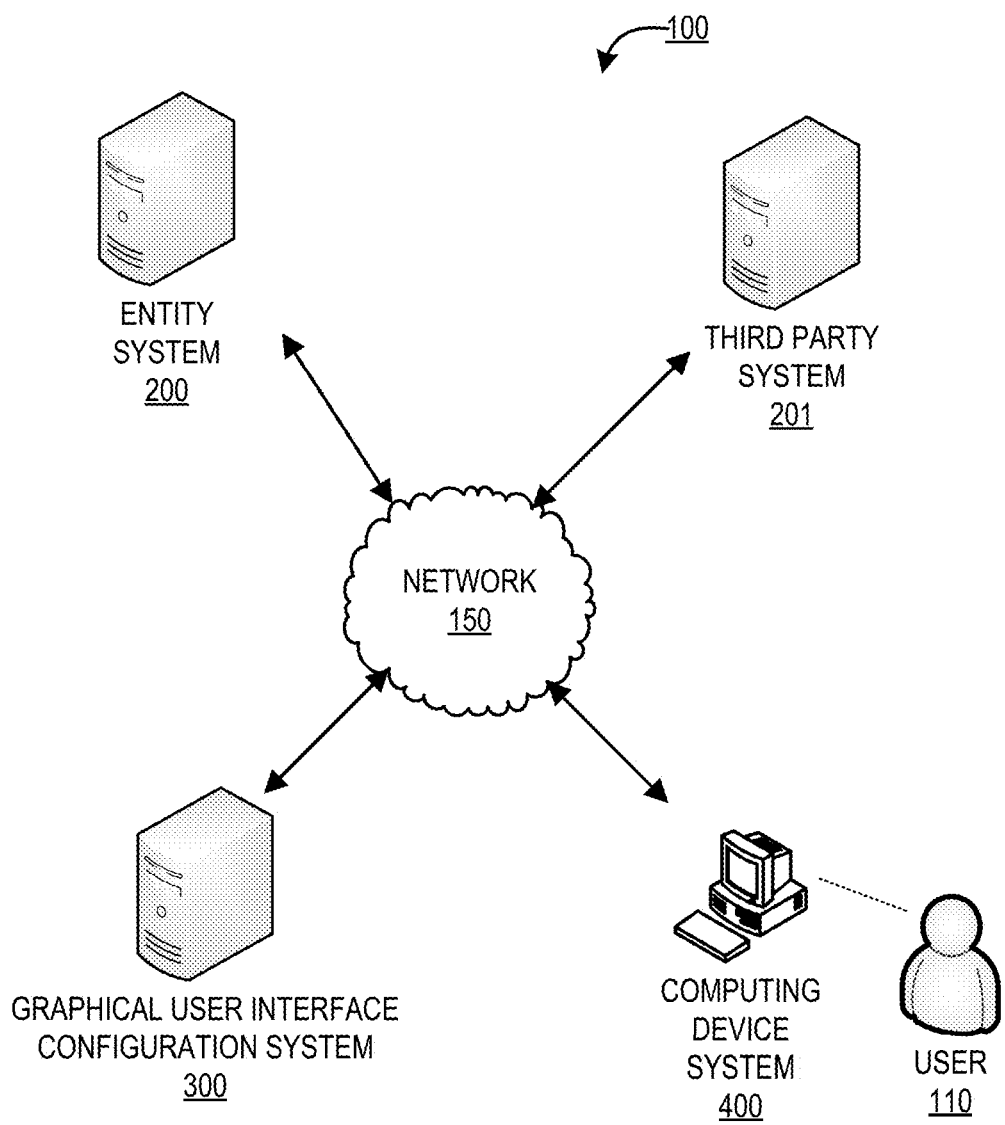
Figure 2:
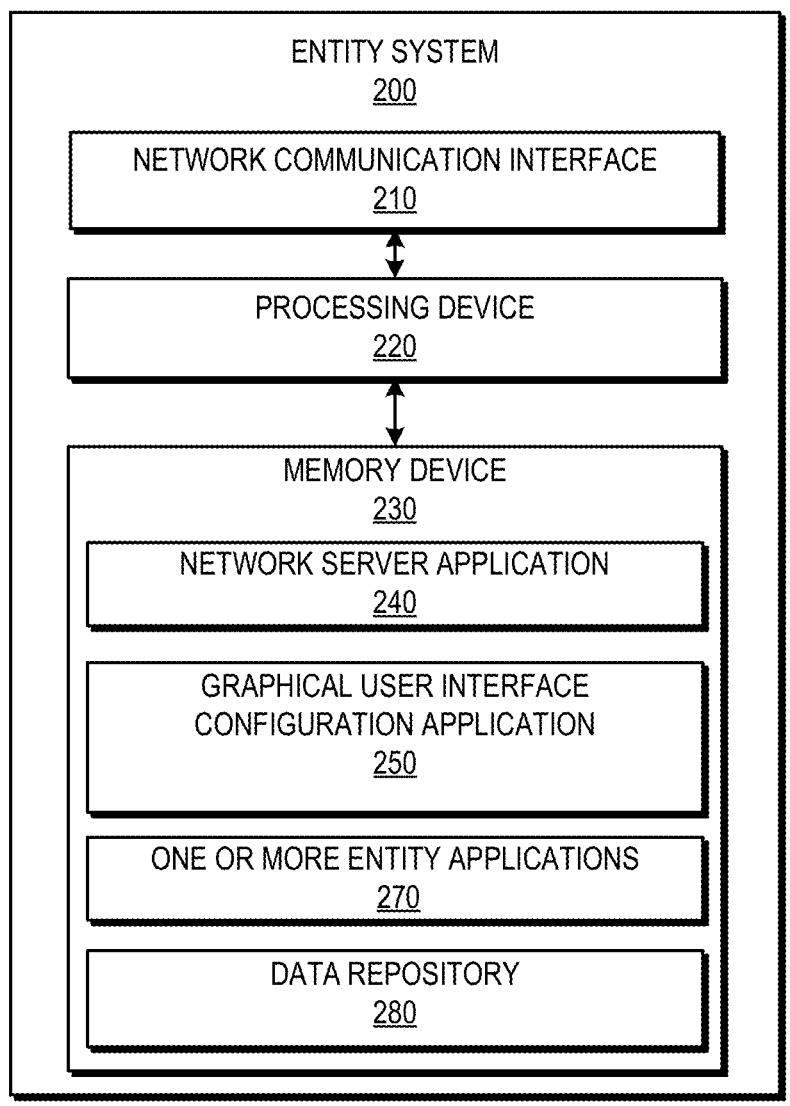
Figure 3:
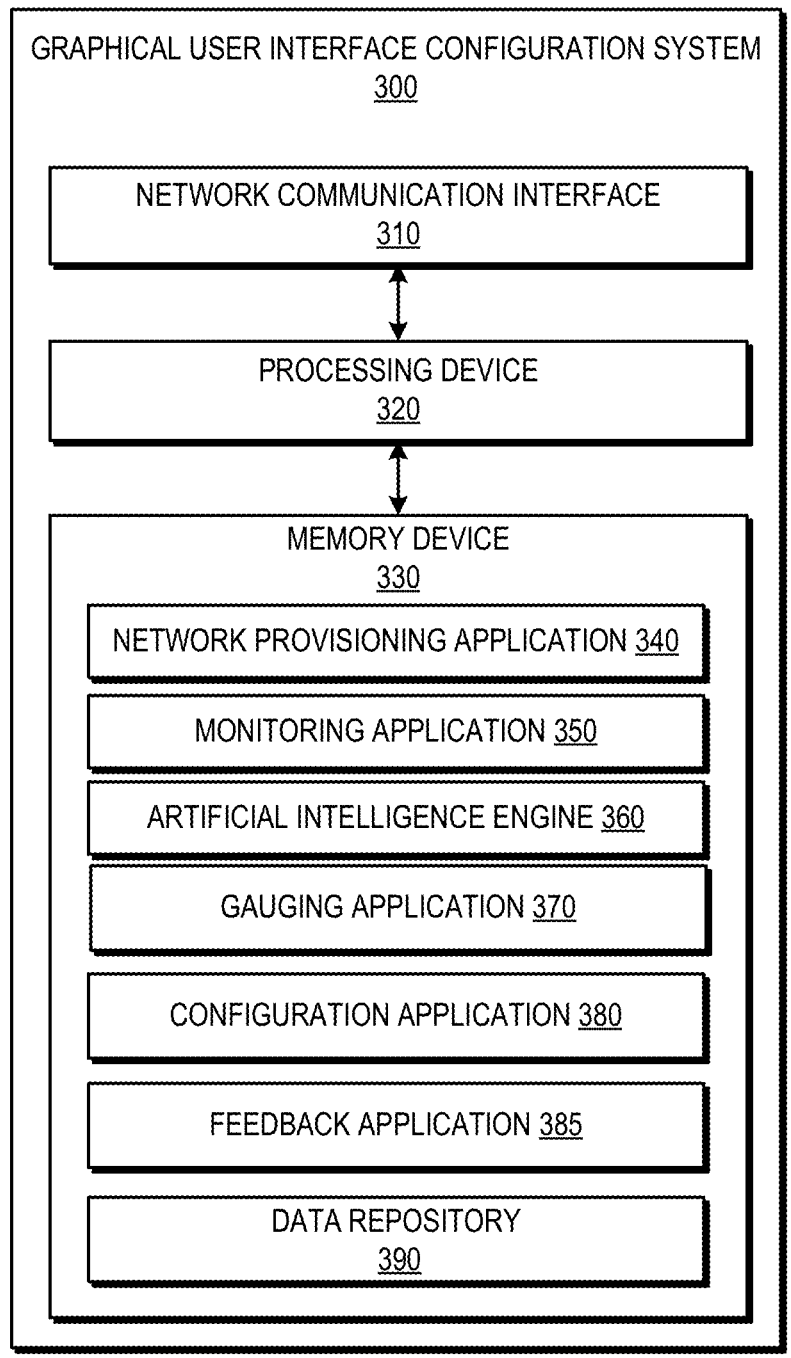
Figure 4:
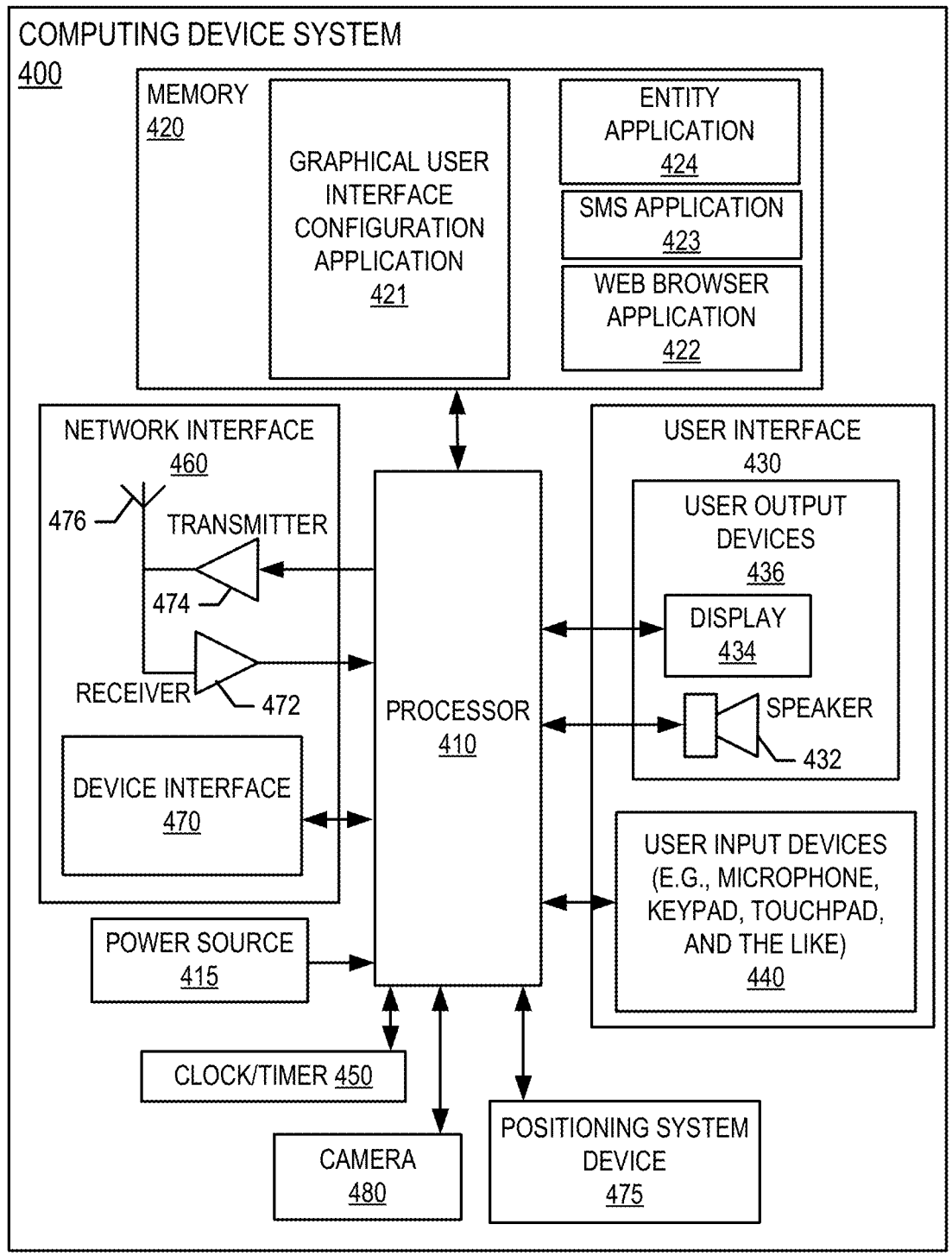
Figure 5:
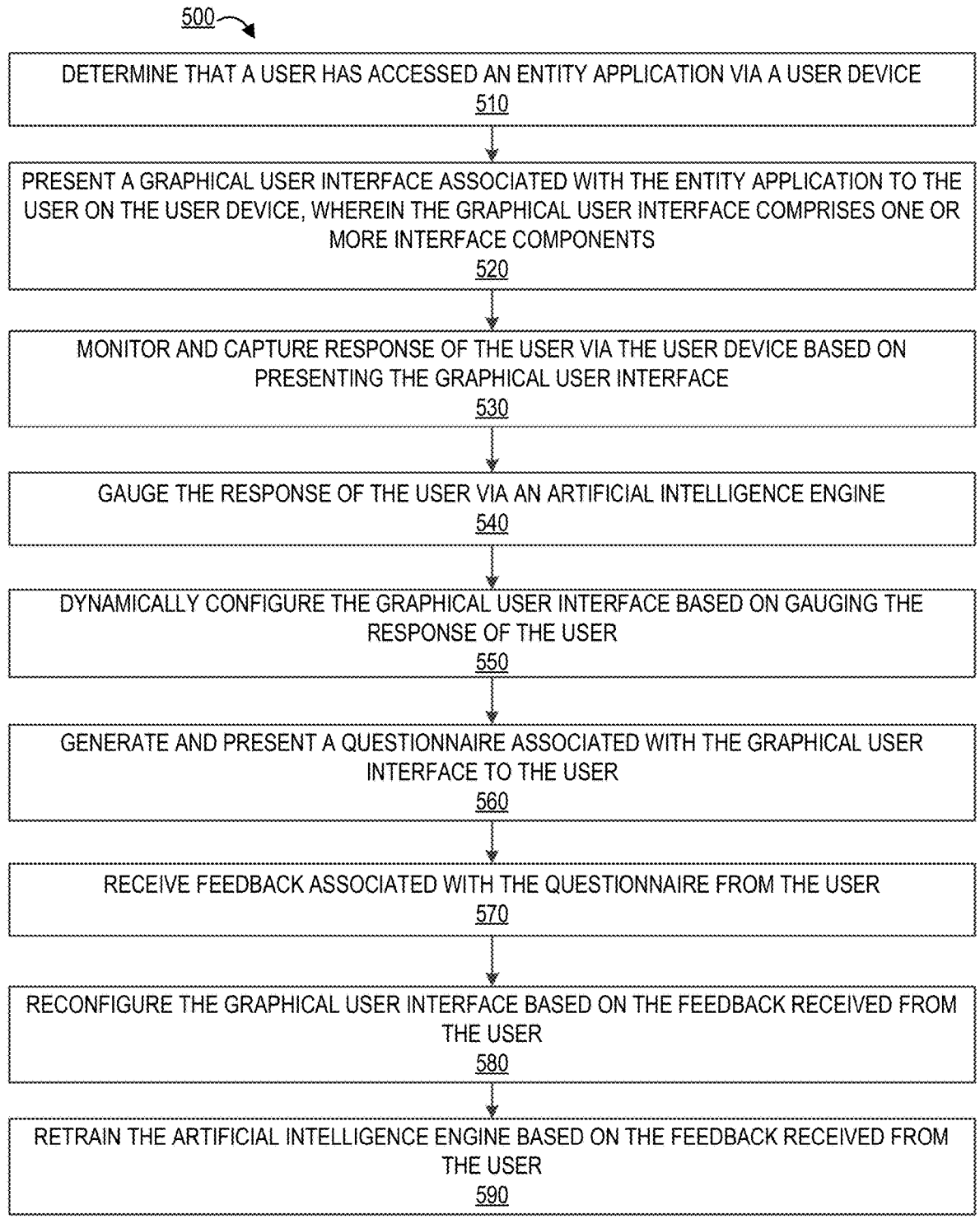

Having thus described embodiments of the invention in general terms, reference will now be made the accompanying drawings, wherein:

FIG. 1 provides a block diagram illustrating a system environment for dynamically configuring graphical user interface based on tracking response to interface components, in accordance with an embodiment of the invention;

FIG. 2 provides a block diagram illustrating the entity system 200 of FIG. 1, in accordance with an embodiment of the invention;

FIG. 3 provides a block diagram illustrating a graphical user interface configuration system 300 of FIG. 1, in accordance with an embodiment of the invention;

FIG. 4 provides a block diagram illustrating the computing device system 400 of FIG. 1, in accordance with an embodiment of the invention; and FIG. 5 provides a flowchart illustrating a process flow for dynamically configuring graphical user interface based on tracking response to interface components, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a"

and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" or "entity" may be any institution which involves in financial transactions. In one embodiment, the term "entity" or "resource entity" may be any financial institution. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution. In some embodiments of the invention, the entity may be any entity that provides one or more applications to one or more users to use one or more features provided by the entity.

As described herein, a "user" may be a customer or a potential customer of the entity. In some embodiments, a "user" may be a financial institution customer (e.g., an account holder or a person who has an account (e.g., banking account, credit account, or the like)). An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by a financial institution.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions (e.g., user interface 430). The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, conventional systems do not have the capability to monitor response of users and then configure graphical user interface of one or more applications based on the response of the users. The system of the present invention solves this problem by monitoring and capturing response of the user, gauging the response of the users, and configuring the graphical user interface based on gauging the response of the users.

FIG. 1 provides a block diagram illustrating a system environment 100 for dynamically configuring graphical user interface based on tracking response to interface components, in accordance with an embodiment of the invention. As illustrated in FIG. 1, the environment 100 includes a graphical user interface configuration system 300, an entity system 200, third party systems 201, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200. In some embodiments, the one or more users 110 are not customers of the entity. In some embodiments, the one or more users 110 are potential customers of the entity. In some embodiments, the one or more users 110 are customers of other entities (e.g., other financial institutions).

The entity system(s) 200 may be any system owned or otherwise controlled by an entity to support or perform one or more process steps described herein. In some embodiments, the entity is a financial institution. In some embodiments, the entity may be a non-financial institution. The one or more third party systems 201 may be any systems that provide external information that the entity can provide to the one or more users via one or more applications.

The graphical user interface configuration system 300 is a system of the present invention for performing one or more process steps described herein. In some embodiments, the graphical user interface configuration system 300 may be an independent system. In some embodiments, the graphical user interface configuration system 300 may be a part of the entity system 200.

The graphical user interface configuration system 300, the entity system 200, the third party systems 201, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the graphical user interface configuration system 300 is configured to communicate information or instructions with the entity system 200, the third party systems 201, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the graphical user interface configuration system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a graphical user interface configuration application 250, one or more entity applications 270, and a data repository 280 comprising data received, extracted, process, and/or the like by the entity system 200. The one or more entity applications 270 may be any applications developed, supported, maintained, utilized, and/or controlled by the entity. The computer-executable program code of the network server application 240, the graphical user interface configuration application 250, the one or more entity application 270 to perform certain logic, data-extraction, and data-storing functions of the entity system 200 described herein, as well as communication functions of the entity system 200.

The network server application 240, the graphical user interface configuration application 250, and the one or more entity applications 270 are configured to store data in the data repository 280 or to use the data stored in the data repository 280 when communicating through the network communication interface 210 with the graphical user interface configuration system 300, and/or the computing device system 400 to perform one or more process steps described herein. In some embodiments, the entity system 200 may receive instructions from the graphical user interface configuration system 300 via the graphical user interface configuration application 250 to perform certain operations. The graphical user interface configuration application 250 may be provided by the graphical user interface configuration system 300. The one or more entity applications 270 may be any of the applications used, created, modified, facilitated, and/or managed by the entity system 200.

FIG. 3 provides a block diagram illustrating the graphical user interface configuration system 300 in greater detail, in accordance with embodiments of the invention. As illustrated in FIG. 3, in one embodiment of the invention, the graphical user interface configuration system 300 includes one or more processing devices 320 operatively coupled to a network communication interface 310 and a memory device 330. In certain embodiments, the graphical user interface configuration system 300 is operated by an entity, such as a financial institution. In some embodiments, the graphical user interface configuration system 300 is owned or operated by the entity of the entity system 200. In some embodiments, the graphical user interface configuration system 300 may be an independent system. In alternate embodiments, the graphical user interface configuration system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the graphical user interface configuration system 300 described herein. For example, in one embodiment of the graphical user interface configuration system 300, the memory device 330 includes, but is not limited to, a network provisioning application 340, a monitoring application 350, an artificial intelligence application 360, a gauging application 370, a configuration application 380, a feedback application 385, and a data repository 390 comprising any data processed or accessed by one or more applications in the memory device 330. The computer-executable program code of the network provisioning application 340, the monitoring application 350, the artificial intelligence application 360, the gauging application 370, the configuration application 380, and the feedback application 385 may instruct the processing device 320 to perform certain logic, data-processing, and data-storing functions of the graphical user interface configuration system 300 described herein, as well as communication functions of the graphical user interface configuration system 300.

The network provisioning application 340, the monitoring application 350, the artificial intelligence application 360, the gauging application 370, the configuration application 380, and the feedback application 385 are configured to invoke or use the data in the data repository 390 when communicating through the network communication interface 310 with the entity system 200, and/or the computing device system 400. In some embodiments, the network provisioning application 340, the monitoring application 350, the artificial intelligence application 360, the gauging application 370, the configuration application 380, and the feedback application 385 may store the data extracted or received from the entity system 200, and the computing device system 400 in the data repository 390. In some embodiments, the network provisioning application 340, the monitoring application 350, the artificial intelligence application 360, the gauging application 370, the configuration application 380, and the feedback application 385 may be a part of a single application. The functionalities of the network provisioning application 340, the monitoring application 350, the artificial intelligence application 360, the gauging application 370, the configuration application 380, and the feedback application 385 are explained in greater detail in FIG. 5.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, a device interface 470, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes a device interface 470, an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network (e.g., similar to network 150). In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 434 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a graphical user interface (e.g., user interface 430) configuration application 421, entity application 424. These applications also typically instructions to a graphical user interface (GUI) (e.g., user interface 430) on the display 434 that allows the user 110 to interact with the entity system 200, the graphical user interface configuration system 300, and/or other devices or systems. The memory 420 of the computing device system 400 may comprise a Short Message Service (SMS) application 423 configured to send, receive, and store data, information, communications, alerts, and the like via the wireless telephone network (e.g., similar to network 150). In some embodiments, the graphical user interface configuration application 421 provided by the graphical user interface configuration system 300 allows the user 110 to access the graphical user interface configuration system 300. In some embodiments, the entity application 424 provided by the entity system 200 and the graphical user interface configuration application 421 allow the user 110 to access the functionalities provided by the graphical user interface configuration system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a flowchart illustrating a process flow for dynamically configuring graphical user interface based on tracking response to interface components, in accordance with an embodiment of the invention.

As shown in block 510, the system determines that a user has accessed an entity application via a user device. The entity application may be any application provided by the entity to one or more users to access one or more features. The system may monitor the activity of the user on the user device (e.g., via the graphical user interface configuration application 421) and may determine that the user has accessed the entity application. In such embodiments, the system may monitor the activity of the user after receiving permission from the user. In some embodiments, the entity application may notify the system that the user has accessed the entity application.

As shown in block 520, the system presents a graphical user interface associated with the entity application to the user on the user device, wherein the graphical user interface comprises one or more interface components. The graphical user interface associated with the entity application may comprise one or more pages and each of the graphical user interface associated with each of the one or more pages may vary. The one or more interface components may include, but are not limited to, text boxes, graphical characters, animated elements, and/or the like.

In some embodiments, the graphical user interface presented to the user may be a generic user interface. In some embodiments, the graphical user interface presented to the user may be a customized user interface, where the customized user interface is generated based on user preferences, interests, type of the user device, historical preference data, current user activity, user location, and/or the like. For example, the system may determine that the user has a language preference and may translate and present the graphical user interface based on the language preference. In some such embodiments, the graphical user interface presented to the user may be a minimalist user interface based on user preferences, where at least one interface component is hidden, thereby making the graphical user interface load faster. In some embodiments, the system may allow the user to select the generic user interface or the customized user interface after determining that the user is accessing the entity application.

In some embodiments, the system may allow the user to customize the graphical user interface using personalized images, videos, or the like. For example, the system may allow the user to upload a photo of their pet and use it in place of an animated character provided in the generic user interface. In some such embodiments, the system may allow the user to revert the customizations and switch back to the previous version of the graphical user interface. In some embodiments, when the user is viewing a customized user interface, the system may allow the user to switch back to the generic user interface. In some embodiments, where the user is customizing the graphical user interface using personalized images, videos, or the like, the system may verify that the customizations requested by the user meet one or more rules, standards, regulations, or the like set by the entity. In one case, upon determining that the customizations meet the entity standards, the system apply the customizations to the graphical user interface. In another case, upon determining that the customizations do not meet the entity standards, the system may display a prompt to the user that the customizations are unavailable and may present alternative customizations.

As shown in block 530, the system monitors and captures response of the user via the user device based on presenting the graphical user interface. In response to presenting the graphical user interface, the system (e.g., the monitoring application 350 of the system) monitors and captures response of the user. Monitoring and capturing the response of the user may comprise controlling one or more components of the user device (e.g., via the graphical user interface configuration application 421). For example, the system may capture the scrolling speed, typing speed, facial expression, pupil dilation, and/or the like based on accessing camera, microphone, touch screen, and/or the like of the user device. In some embodiments, the system may monitor and capture the response of the user via the one or more components of the user device only after receiving permissions from the user.

As shown in block 540, the system gauges the response of the user via an artificial intelligence engine. The artificial intelligence engine may be trained using user preferences, interests, cultural data, historical data, and/or the like. In some embodiments, the artificial intelligence engine is provided with one or more filters to filter out training data that does not meet the entity standards. The artificial intelligence engine may gauge the response of the user by performing at least one biometrics, facial analysis, vocal analysis, pupillary data analysis, and/or the like on the data captured by the system in block 530. For example, the system may perform facial analysis to analyze facial expressions of the user captured by the system to determine emotion of the user while viewing the graphical user interface presented by the system.

As shown in block 550, the system dynamically configures the graphical user interface based on gauging the response of the user. In some embodiments, the artificial intelligence engine may suggest the configurations to the system. Configuring the graphical user interface may comprise at least one of (i) replacing a first interface component of the one or more interface components with a second interface component, (ii) adding additional content on the graphical user interface, (iii) rearranging content of the graphical user interface, and (iv) reconfiguring the one or more interface components. In one example, the system may determine that the emotional response of the user is not satisfactory and may replace an animation object with a different animation object. In another example, the system may determine that the user is interested in the content presented in an interface component (text box) and may dynamically create another text box with additional information associated with the content that the user viewed with interest. In another example, the system may determine that the user often accesses a graphical component and has to scroll to the bottom of the page to get to a graphical component. In such a case, the system may rearrange the content to show up at the top of the page of the entity application. In another example, the system may determine that the user is unable to read the text provided in the graphical user interface based on analyzing and gauging the response of the user by performing facial analysis and may increase the font of the text box.

In some embodiments, the system may configure the graphical user interface after gauging the response of the user based on user preferences, interests, type of the user device, historical preference data, current user activity, user location, and/or the like. For example, the system may determine that the user is at an airport, may gauge the response of the user as not satisfactory when presented with a graphical user interface, may identify that the user does not like air travel, and may configure the graphical user interface to present an interface component to play soothing music. In some embodiments, the system may generate and display a prompt before configuring the graphical user interface. Continuing with the previous example, the system may generate and present a prompt to know more about current user preference before playing soothing music. In another example, where the user is unable to read the text, the system may generate and present a prompt to confirm the font size before increasing the font of the text. In some embodiments, the graphical user interface presented by the system to the user adhere to one or more regulations, where the one or more regulations may be retrieved from one or more external sources.

In some embodiments, the user preferences or interests may be updated anytime by the user and/or the system based on new data about the user. In some embodiments, the system and/or the artificial intelligence engine may be provided with one or more filters to selectively choose from the user preferences and interests of the user while configuring the graphical user interface. For example, if any of the user preferences do not meet the entity standards, the system may filter out such preferences and consider the remaining preferences to configure the graphical user interface.

As shown in block 560, the system generate and presents a questionnaire associated with the graphical user interface to the user. In some embodiments, the questionnaire may be generated based on gauging the emotional response of the user. For example, the system may determine that the emotional response is not satisfactory and may generate a questionnaire to determine what caused the response. In some embodiments, the questionnaire generated by the system may be in the form of audio, video, text, or the like. The type of questionnaire generated by the system may be based on the type of the user device, user preferences, or the like. For example, if the user prefers to receive an audio questionnaire, the system generates and presents the questionnaire in an audio format.

As shown in block 570, the system receives feedback associated with the questionnaire from the user. As shown in block 580, the system reconfigures the graphical user interface based on the feedback received from the user. As shown in block 590, the system retrains the artificial intelligence engine based on the feedback received from the user.

In some embodiments after completing the process flow, the system may present at least one other graphical user interface associated with at least one other page of the entity application, may monitor and capture the response of the user associated with the at least one other graphical user interface, may gauge the response of the user, and may configure the at least one other graphical user interface based on gauging the response of the user. The system may repeat the process flow 500 for one or more pages of the entity application.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for dynamically configuring a graphical user interface based on tracking a response to one or more interface components, the system comprising:
   at least one network communication interface;
   at least one non-transitory storage device; and
   at least one processing device coupled to the at least one non-transitory storage device and the at least one network communication interface, wherein the at least one processing device is configured to:
   determine that a user has accessed an entity application via a user device;
   present the graphical user interface associated with the entity application to the user on the user device, wherein the graphical user interface comprises the one or more interface components, wherein the graphical user interface is a custom user interface associated with the user, wherein the custom user interface comprises at least the one or more interface components with personalized images and videos in place of generic interface components present in a generic graphical user interface;
   monitor and capture the response of the user via the user device based on presenting the graphical user interface, wherein capturing the response of the user comprises capturing a scrolling speed, a typing speed, facial expression, and pupil dilation;
   gauge the response of the user via an artificial intelligence engine based on capturing the response of the user associated with the graphical user interface, wherein gauging the response of the user comprises performing at least a biometrics analysis;
   dynamically configure the graphical user interface based on gauging the response of the user, wherein dynamically configuring the graphical user interface comprises at least replacing a first interface component of the one or more interface components comprising at least visual elements, animated elements, and audio elements with a second interface component;
   generate a questionnaire associated with the graphical user interface;
   present the questionnaire to the user;
   receive feedback associated with the questionnaire from the user;
   reconfigure the graphical user interface based on the feedback received from the user;
   receive a request from the user to switch the graphical user interface to the generic graphical user interface; and
   revert configurations and reconfigurations applied to the graphical user interface and present the generic graphical user interface to the user.

2. The system of claim 1, configuring the graphical user interface further comprises:
   adding additional content on the graphical user interface;
   rearranging content of the graphical user interface; and
   reconfiguring the one or more interface components.

3. The system of claim 1, wherein the questionnaire is generated based on gauging the response of the user.

4. The system of claim 1, wherein the at least one processing device is configured to retrain the artificial intelligence engine based on the feedback received from the user.

5. The system of claim 1, wherein the at least one processing device is configured to monitor and capture the response of the user via one or more components of the user device.

6. The system of claim 1, wherein the at least one processing device is configured to:
   present at least one other graphical user interface associated with at least one other page of the entity application;
   monitor and capture a second response of the user associated with the at least one other graphical user interface;
   gauge the second response of the user; and
   configure the at least one other graphical user interface based on gauging the second response of the user.

7. A computer program product for dynamically configuring a graphical user interface based on tracking a response to one or more interface components, the computer program product comprising a non-transitory computer-readable storage medium having computer executable instructions for causing a computer processor to perform steps of:
   determining that a user has accessed an entity application via a user device;
   presenting the graphical user interface associated with the entity application to the user on the user device, wherein the graphical user interface comprises the one or more interface components, wherein the graphical user interface is a custom user interface associated with the user, wherein the custom user interface comprises at least the one or more interface components with personalized images and videos in place of generic interface components present in a generic graphical user interface;
   monitoring and capturing the response of the user via the user device based on presenting the graphical user interface, wherein capturing the response of the user comprises capturing a scrolling speed, a typing speed, facial expression, and pupil dilation;
   gauging the response of the user via an artificial intelligence engine based on capturing the response of the user associated with the graphical user interface, wherein gauging the response of the user comprises performing at least a biometrics analysis;
   dynamically configuring the graphical user interface based on gauging the response of the user, wherein dynamically configuring the graphical user interface comprises at least replacing a first interface component of the one or more interface components comprising at least visual elements, animated elements, and audio elements with a second interface component;

generating a questionnaire associated with the graphical user interface;

presenting the questionnaire to the user;

receiving feedback associated with the questionnaire from the user;

reconfiguring the graphical user interface based on the feedback received from the user;

receiving a request from the user to switch the graphical user interface to the generic graphical user interface; and reverting configurations and reconfigurations applied to the graphical user interface and present the generic graphical user interface to the user.

8. The computer program product of claim 7, wherein configuring the graphical user interface further comprises:
adding additional content on the graphical user interface;
rearranging content of the graphical user interface; and
reconfiguring the one or more interface components.

9. The computer program product of claim 7, wherein the computer executable instructions cause the computer processor to perform the step of retraining the artificial intelligence engine based on the feedback received from the user.

10. The computer program product of claim 7, wherein the questionnaire is generated based on gauging the response of the user.

11. The computer program product of claim 7, wherein the computer executable instructions cause the computer processor to perform the step of monitoring and capturing the response of the user via one or more components of the user device.

12. The computer program product of claim 7, wherein the computer executable instructions cause the computer processor to perform the steps of:
presenting at least one other graphical user interface associated with at least one other page of the entity application;
monitoring and capturing a second response of the user associated with the at least one other graphical user interface;
gauging the second response of the user; and
configuring the at least one other graphical user interface based on gauging the second response of the user.

13. A computer implemented method for dynamically configuring a graphical user interface based on tracking a response to one or more interface components, wherein the method comprises:
determining that a user has accessed an entity application via a user device;
presenting the graphical user interface associated with the entity application to the user on the user device, wherein the graphical user interface comprises the one or more interface components, wherein the graphical user interface is a custom user interface associated with the user, wherein the custom user interface comprises at least the one or more interface components with personalized images and videos in place of generic interface components present in a generic graphical user interface;
monitoring and capturing the response of the user via the user device based on presenting the graphical user interface, wherein capturing the response of the user comprises capturing a scrolling speed, a typing speed, facial expression, and pupil dilation;
gauging the response of the user via an artificial intelligence engine based on capturing the response of the user associated with the graphical user interface, wherein gauging the response of the user comprises performing at least a biometrics analysis;
dynamically configuring the graphical user interface based on gauging the response of the user, wherein dynamically configuring the graphical user interface comprises at least replacing a first interface component of the one or more interface components comprising at least visual elements, animated elements, and audio elements with a second interface component;
generating a questionnaire associated with the graphical user interface;
presenting the questionnaire to the user;
receiving feedback associated with the questionnaire from the user;
reconfiguring the graphical user interface based on the feedback received from the user;
receiving a request from the user to switch the graphical user interface to the generic graphical user interface; and
reverting configurations and reconfigurations applied to the graphical user interface and present the generic graphical user interface to the user.

14. The computer implemented method of claim 13, wherein configuring the graphical user interface further comprises:
adding additional content on the graphical user interface;
rearranging content of the graphical user interface; and
reconfiguring the one or more interface components.

15. The computer implemented method of claim 13, wherein the method further comprises retraining the artificial intelligence engine based on the feedback received from the user.

16. The computer implemented method of claim 13, wherein the questionnaire is generated based on gauging the response of the user.

17. The computer implemented method of claim 13, wherein monitoring and capturing the response of the user is performed via one or more components of the user device.

* * * * *